May 22, 1928.  1,670,322
J. M. TEAHEN ET AL
COMBINED COVER LOCK AND BUMPER FOR WATER CLOSETS
Filed May 25, 1925   3 Sheets-Sheet 1

Inventors
James M. Teahen
William Taylor

May 22, 1928. 1,670,322
J. M. TEAHEN ET AL
COMBINED COVER LOCK AND BUMPER FOR WATER CLOSETS
Filed May 25, 1925  3 Sheets-Sheet 2

Inventors
James M. Teahen
William Taylor

By Whittemore Hulbert Whittemore
+Belknap  Attorneys

May 22, 1928. 1,670,322
J. M. TEAHEN ET AL
COMBINED COVER LOCK AND BUMPER FOR WATER CLOSETS
Filed May 25, 1925   3 Sheets-Sheet 3

Inventor
James M. Teahen
William Taylor
By Whitmore Hulbert Whittemore
+Belknap   Attorneys Patented May 22, 1928.

1,670,322

UNITED STATES PATENT OFFICE.

JAMES M. TEAHEN AND WILLIAM TAYLOR, OF DETROIT, MICHIGAN; SAID TAYLOR ASSIGNOR TO SAID TEAHEN.

COMBINED COVER LOCK AND BUMPER FOR WATER-CLOSETS.

Application filed May 25, 1925. Serial No. 32,843.

This invention relates to water closets of that type in which the flushing tank and bowl are integral, the requisite velocity for flushing being obtained by siphonic action. The invention consists in the novel construction of such a combined tank and bowl and the means employed for securing the seat and cover thereto, for forming a stop or bumper for said cover and other features hereinafter set forth.

A is a bowl supported upon the pedestal B containing the trap C, and D is an integral tank extending from the sides of the bowl rearward and preferably flaring to a greater width than the bowl. E is a hollow rim surrounding the bowl and F is a rearward extension of this rim which forms a fixed cover for a portion of the tank terminating in an upwardly extending wall which rises to a greater height than the rim. G is a detachable cover which is seated on the upwardly extending portion of the tank and provides access to the fitting within said tank.

The seat H and cover I therefor are secured to a hinge fitting J including post or bracket members K. These are supported upon the rearwardly extending wall F and have shanks extending through apertures in said wall to engage clamping nuts for securing the same in position. To prevent the seat H and cover I from falling against the tank to the injury of the same, the tank cover G is provided with a central boss or raised portion M. This is apertured or recessed at N to receive the shank of a rubber bumper O, said bumper forming a resilient stop for the seat cover I. Thus, by this single bumper attached to the tank cover, the seat and seat cover are held from striking against the tank. The seat H is provided with the usual rubber pads P for resting above the rim of the bowl and the cover I with the pads or knobs Q for resting on the seat.

Figure 1:
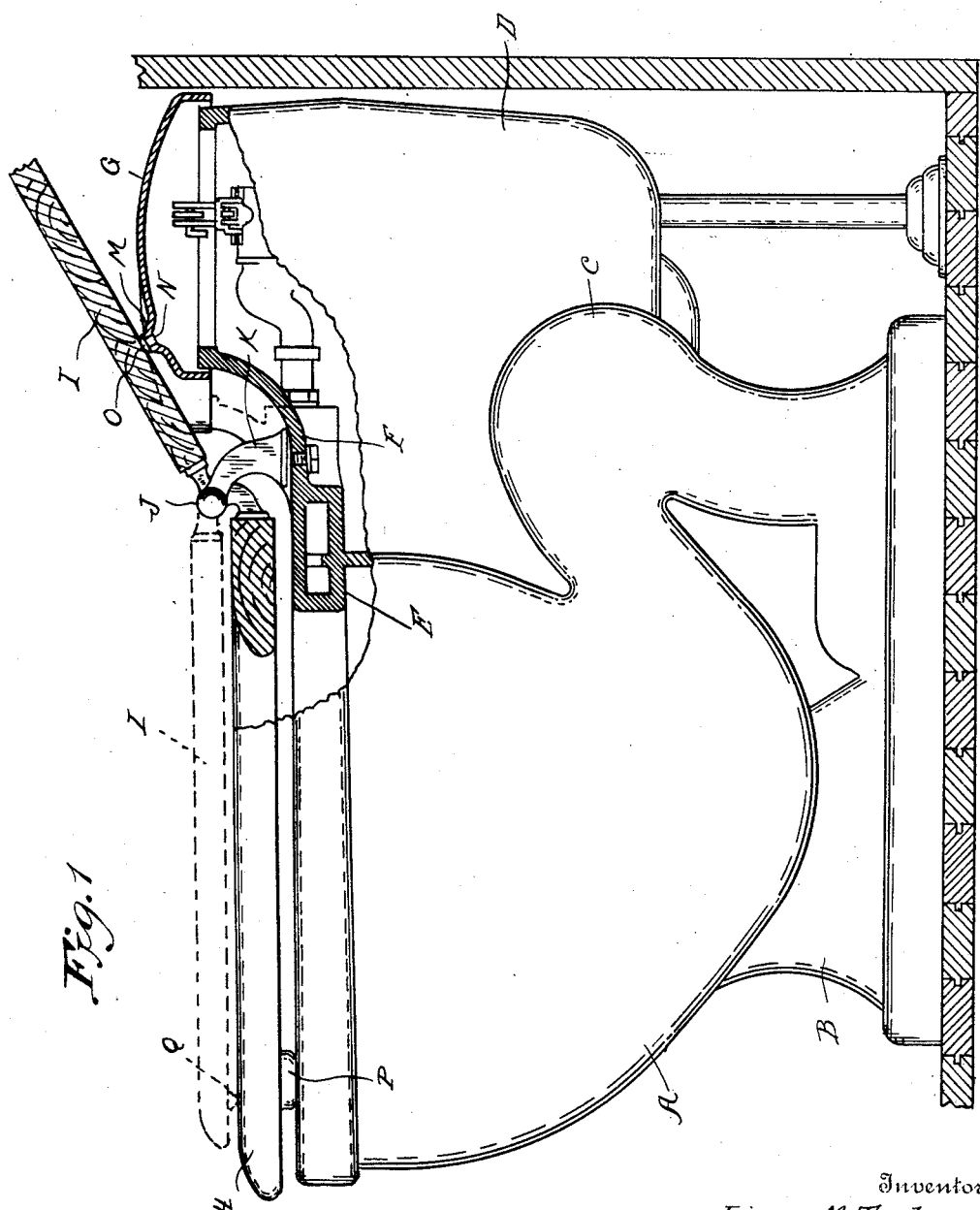
Figure 1 is a sectional side elevation of the water closet.
Figure 2:
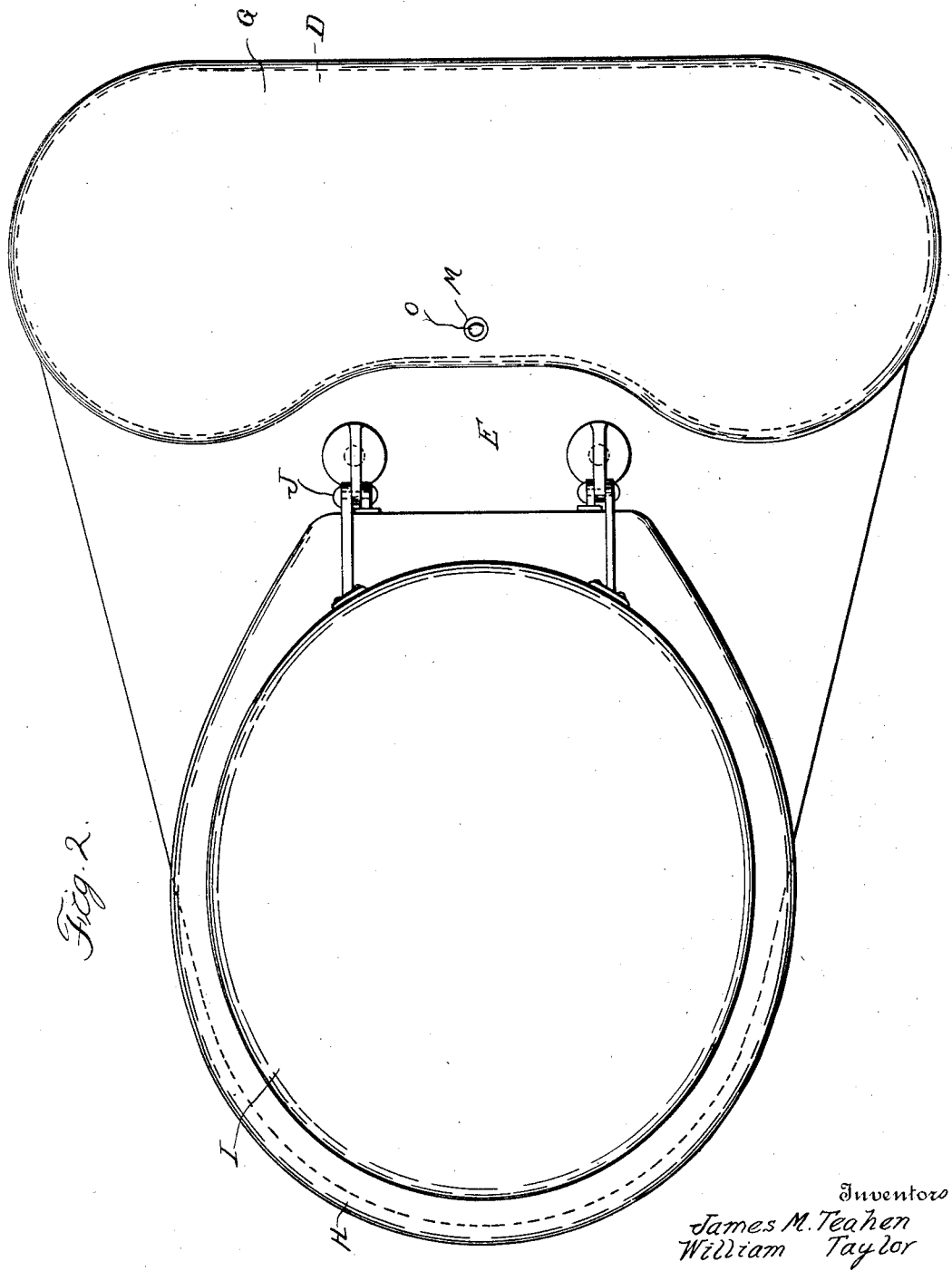
Figure 2 is a plan view thereof.
Figure 3:
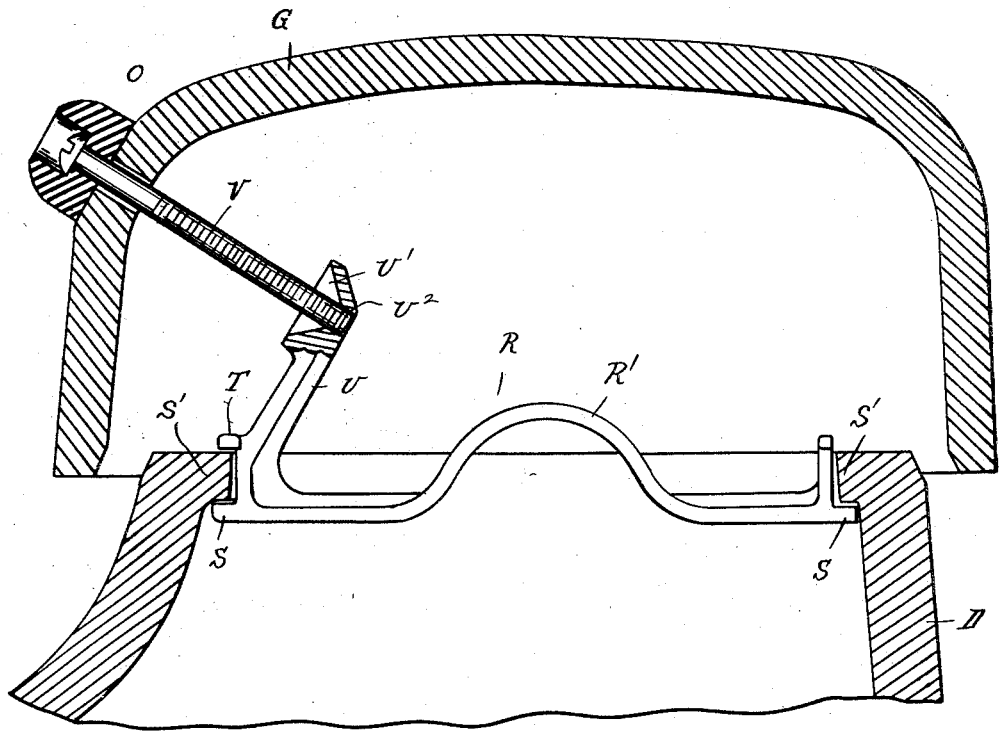
Figure 3 is a section similar to a portion of Figure 1 showing a modified construction.
Figure 4:
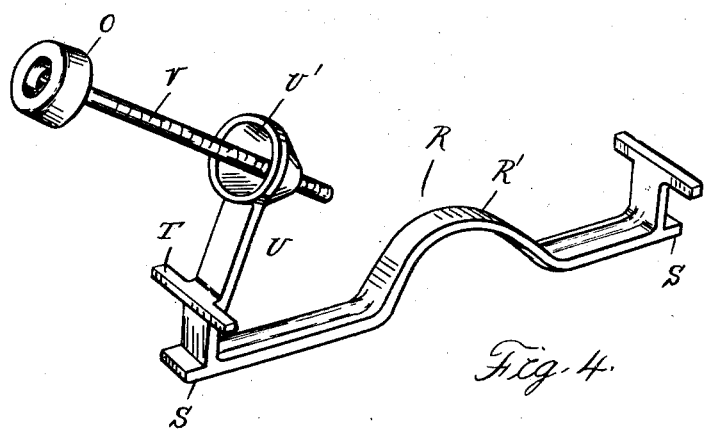
Figure 4 is a perspective view of the cover locking means.

With the construction shown in Figures 3 and 4 the bumper O performs in conjunction with other parts, the additional function of a lock for the cover of the tank. Thus, as shown, R is a bar of a length to extend across the upper end of the tank being provided with the lugs S for hooking beneath the inwardly extending flanges S' on the tank. At one end this bar R is also provided with a bearing T resting on the top of the flange S' and with the upwardly and obliquely inclined extension U having a cup shaped recess U' and a threaded central aperture U². The bumper O is secured to the cover by a screw V the head of which engages a recess in said bumper and a shank passing through the cover and being threaded to engage the threaded aperture U² of the extension U and thus when the screw is tightened it will not only hold the bumper in position but will also secure the cover to the tank. To prevent overstressing the tank by the bar R in case of expansion of the latter, the central portion of said bar is preferably laterally bent as shown at R' to permit it to yield.

What we claim as our invention is:

1. In a water closet the combination with a bowl and a tank in rear thereof extending for a slight distance only above the bowl, of a seat and cover hingedly attached to a portion of said tank at a point permitting the turning back of the same into a rearwardly inclined position for resting on the top of said tank.

2. In a water closet the combination with a bowl and a tank in rear thereof extending for a slight distance only above the bowl, of a seat and cover hingedly attached to a portion of said tank at a point permitting the turning back of the same into a rearwardly inclined position for resting on the top of said tank, and a stop or bumper on said tank against which said cover rests.

3. In a water closet, the combination with a bowl and a tank integral therewith extending rearward and slightly upward above the top of the bowl, of a removable cover for said tank, a seat and cover therefor hingedly attached to a portion of said tank at a point permitting of turning to a rearwardly inclined position extending over said cover and a stop or bumper on said tank cover against which said seat cover rests.

4. In a water closet, the combination with a bowl, of a tank integral therewith, a wall extending rearward from said bowl forming a stationary cover over a portion of said tank, a seat and cover therefor and a hinge fitting for said seat and cover extending upward from said rearwardly extending wall and secured thereto within said tank.

5. In a water closet, the combination with a bowl, of a tank integral therewith and extending at the sides and to the rear of said bowl, a wall extending from the rim of the bowl forming a fixed cover for a portion of said tank, at the sides of the bowl and also a portion in rear thereof, a seat, posts to which said seat is hinged engaging apertures in said rearwardly extending wall or fixed cover for the tank and securing means for said posts within said tank.

6. In a water closet, the combination with a bowl and a tank integral therewith, of a seat hingedly connected to said bowl, a cover for said tank and means for locking said cover to the tank also constituting the securing means for a bumper for said seat.

7. In a water closet, the combination with a bowl, and a tank integral therewith, of a seat hingedly connected to said bowl, a cover for said tank, a bumper engaging said cover and provided with a shank extending through the same and cooperating means within the tank for engaging said shank and locking said cover in position.

8. In a water closet the combination with a bowl and a tank integral therewith, of a seat hingedly connected to said bowl, a cover for said tank, a bar extending across the upper end of said tank in locking engagement therewith, a bumper on said cover for engaging said seat and a threaded shank for said bumper passing through said cover and engaging said bar to lock said cover in position.

In testimony whereof we affix our signatures.

JAMES M. TEAHEN.
WILLIAM TAYLOR.